Oct. 31, 1967
W. H. NEBGEN
3,349,569
ANHYDROUS AMMONIA SCRUBBING OF AMMONIA SYNTHESIS GAS
Filed Feb. 14, 1966
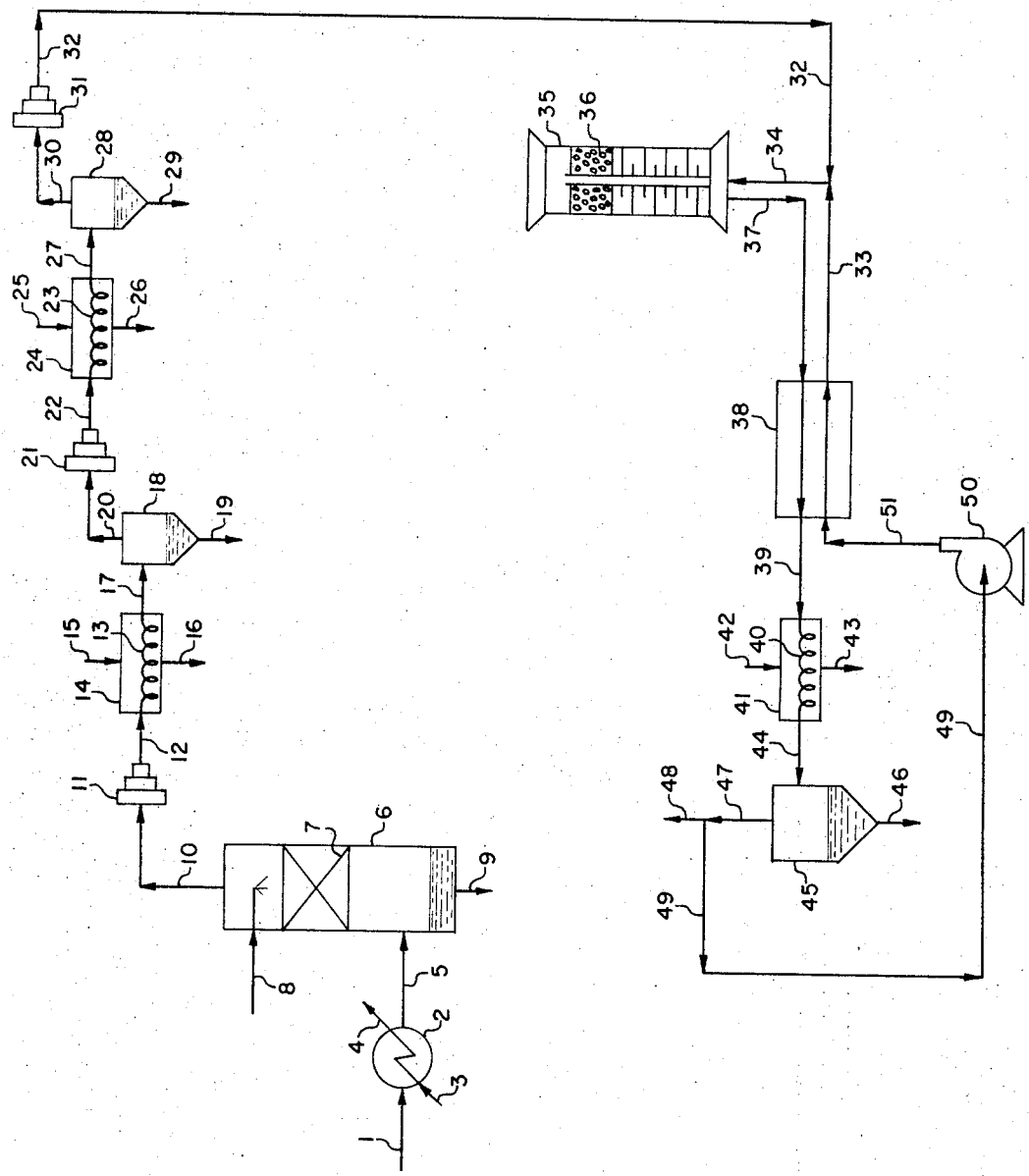
WILLIAM H. NEBGEN
INVENTOR.
BY J. T. Chaloty
AGENT ammonia. Another objection to this procedure is that impurity removal may not be as complete as desired, and final impurity removal is relatively more difficult, since the residual impurities are distributed through the circulating gas stream prior to removal and thus must be subsequently removed from a much greater gas volume.

Another prior art procedure for removal of residual impurities from the ammonia synthesis gas entails the compression of the make-up synthesis gas, followed by scrubbing of the make-up synthesis gas at elevated pressure with liquid ammonia. In this procedure, as generally disclosed in U.S. Patent No. 1,815,243 and Canadian Patent No. 257,043, the scrubbing is carried out with cold liquid ammonia at ammonia synthesis pressure, and the resulting purified synthesis gas is added to the recirculating synthesis gas in the synthesis loop. In U.S. Patent No. 1,830,167, the make-up synthesis gas containing impurities is compressed and added to the recirculating synthesis gas being recycled to the synthesis converter, after product liquid ammonia has been removed from the circulating gas stream. The combined gas stream is scrubbed with liquid ammonia for impurity removal, and is then passed to the ammonia converter for synthesis of ammonia.

In the present invention, the make-up ammonia synthesis gas, initially consisting principally of a nitrogen-hydrogen mixture and containing minor residual amounts of impurities including carbon dioxide and water vapor, is scrubbed with substantially anhydrous liquid ammonia before compression. This initial scrubbing step accomplishes two important functions, with respect to purification of the gas stream and subsequent compression. One result of the scrubbing is that a major portion of the impurities content, including substantially all of the water vapor, is dissolved in the liquid ammonia phase and thus is removed from the synthesis gas. Another important result takes place because the scrubbing takes place at a reduced pressure in the range of 2 kg./sq. cm. to 100 kg./sq. cm., before compression of the synthesis gas to ammonia synthesis pressure. The contact of the gas stream with the substantially anhydrous liquid ammonia is essentially adiabatic, and due to the evolution of ammonia vapor into the gas stream and resultant substantial saturation of the gas stream with ammonia vapor, the gas stream is cooled to a very low temperature in the range of $-10°$ C. to $-50°$ C. before compression. As a result a substantial reduction in total compression power requirement is attained, even though an additional ammonia vapor component is added to the gas stream, because there is a substantial net reduction in total gas volume before compression due to the cooling effect.

After one stage of compression of the scrubbed cold synthesis gas, now containing ammonia vapor and free of water vapor, the compressed and concomitantly heated synthesis gas is subjected to cooling, preferably refrigerated cooling such as is disclosed in U.S. Patent No. 3,159,008. The compressed synthesis gas is cooled to a temperature below $0°$ C., and due to the prior saturation of the gas stream with ammonia vapor at reduced pressure, a condensation of anhydrous liquid ammonia from the gas stream takes place upon cooling at elevated pressure. The condensation of anhydrous liquid ammonia from the synthesis gas stream after compression and cooling produces another important result of the present invention, in that the condensed anhydrous liquid ammonia contains dissolved impurities derived from the synthesis gas stream, and thus a highly effective and complete purification of the synthesis gas stream is attained, due to the in situ condensation of anhydrous liquid ammonia from within the gas stream. The condensed anhydrous liquid ammonia is then separated from the purified synthesis gas stream, which may then be further compressed as

United States Patent Office 3,349,569
Patented Oct. 31, 1967

3,349,569
ANHYDROUS AMMONIA SCRUBBING OF AMMONIA SYNTHESIS GAS
William H. Nebgen, Woodside, N.Y., assignor to Chemical Construction Corporation, New York, N.Y., a corporation of Delaware
Filed Feb. 14, 1966, Ser. No. 527,276
10 Claims. (Cl. 62—17)

The present invention relates to the production of ammonia by the catalytic reaction of a mixed nitrogen-hydrogen synthesis gas, and is more particularly related to an improved method for the purification and compression of ammonia synthesis gas.

Ammonia synthesis gas, which consists principally of a nitrogen-hydrogen gas mixture having a molar ratio of 3 moles of hydrogen per mole of nitrogen, may be produced by a variety of procedures. In most commercial facilities, synthesis gas is produced by conversion of a fluid hydrocarbon such as natural gas to a crude synthesis gas containing hydrogen, carbon monoxide and carbon dioxide. The hydrocarbon conversion is generally carried out by partial oxidation or catalytic steam reforming. The steam reforming reaction generally consists of primary steam reforming, in which the fluid hydrocarbon is reacted with steam in the presence of a nickel catalyst, followed by addition of air to the process gas stream and further reaction in the presence of a nickel catalyst, known as secondary reforming. In most cases, the crude gas stream derived from partial oxidation or steam reforming is cooled in a waste heat steam boiler and is then subjected to catalytic water gas shift reaction, in which further hydrogen is produced by reaction of carbon monoxide with steam. The resulting gas stream now principally contains hydrogen, nitrogen and carbon dioxide. Most of the carbon dioxide is removed by a conventional procedure, such as by scrubbing the gas stream with an aqueous alkaline absorbent solution, typically aqueous monoethanolamine or potassium carbonate solution.

The final synthesis gas now consists principally of nitrogen and hydrogen in a substantially 1:3 molar ratio, together with minor residual amounts of impurities including carbon dioxide, methane, argon and water vapor. Other undesirable impurities which may be present in the synthesis gas stream in very minor or trace quantities include carbon monoxide, hydrogen sulfide and carbonyl sulfide. The essentially complete removal of oxidizing impurities, such as carbon dioxide and water vapor is required in practice, in order to avoid oxidation of the ammonia synthesis catalyst, which has a deleterious effect on catalyst activity. One prior art procedure for removal of residual impurities from the ammonia synthesis gas consists of compressing the impurity-containing synthesis gas to ammonia synthesis pressure, and adding the compressed synthesis gas as make-up to the recirculating synthesis gas stream in the synthesis loop after the recirculating gas stream has passed in contact with the ammonia synthesis catalyst, and prior to condensation of product ammonia from the gas stream by refrigerated cooling. The condensing product liquid ammonia serves to absorb and remove the residual impurities from the gas phase, and after separation of product liquid ammonia containing the dissolved impurities, the purified gas is warmed and recirculated to ammonia synthesis. This procedure is objectionable because the compressed make-up synthesis gas serves to dilute the circulating synthesis gas prior to liquid ammonia condensation, and consequently lower temperature levels are needed and greater refrigeration capacity is required for effective condensation and removal of product liquid ammonia, since the partial pressure of ammonia vapor in the gas stream is lowered by the addition of the make-up gas component which contains no required prior to passing the substantially impurity-free synthesis gas to ammonia synthesis.

A salient feature and advantage of the present invention is that complete purification of the synthesis gas stream is attained in an improved and more effective manner, namely by the combination of the initial scrubbing with substantially anhydrous liquid ammonia before compression, which removes most of the impurities including substantially all of the water vapor, together with the subsequent in situ condensation of anhydrous liquid ammonia from the gas stream after the first stage of compression. Another important advantage of the invention is that compression power requirements for the first stage of compression are substantially reduced, due to the prior gas cooling effect attained by the adiabatic scrubbing of the synthesis gas with substantially anhydrous liquid ammonia. As discussed supra, this cooling effect is attained by direct contact of the gas stream with the liquid ammonia, which results in vaporization of ammonia into the gas stream and substantial saturation of the gas stream with ammonia vapor.

It is an object of the present invention to provide an improved ammonia synthesis procedure.

Another object is to purify ammonia synthesis gas in an improved manner.

A further object is to reduce compression power requirements for compression of ammonia synthesis gas.

An adidtional object is to purify ammonia synthesis gas by a combined purification prior to and during compression.

Still another object is to utilize substantially anhydrous liquid ammonia for direct contact scrubbbing and cooling of ammonia synthesis gas prior to compression, in order to purify the ammonia synthesis gas prior to compression and also reduce compression power requirements.

An object is to substantially saturate ammonia synthesis gas with ammonia vapor prior to compression, and thereby condense anhydrous liquid ammonia containing dissolved impurities from the synthesis gas by refrigeration of the gas stream after compression.

These and other objects and advantages of the present invention will become evident from the description which follows. Referring to the figure, which is a flowsheet of a preferred embodiment of the present invention, the input ammonia synthesis gas stream 1 is derived from conventional prior processing such as catalytic hydrocarbon steam reforming or partial oxidation as described supra. Stream 1 is at a pressure level comparable to that of prior processing, and in the range of 2 kg./sq. cm. to 100 kg./sq. cm. The input stream 1 consists principally of a nitrogen-hydrogen gas mixture with a substantially 1:3 molar ratio of nitrogen to hydrogen, and contains minor residual amounts of impurities including carbon dioxide and water vapor, and will usually also contain a minor proportion of inerts such as methane and argon.

Stream 1 is preferably precooled prior to liquid ammonia scrubbing, and will thus usually be passed into precooler 2 for cooling by heat exchange with a suitable cooling fluid such as chilled water or a refrigerant, which is passed into unit 2 via stream 3 and discharged via stream 4. The resulting cooled synthesis gas stream 5 is discharged from unit 2 at a reduced temperature typically in the range of 5° C. to 30° C.

Stream 5 is now scrubbed with substantially anhydrous liquid ammonia in accordance with the present invention. Thus, synthesis gas stream 5 is passed into gas-liquid contact scrubber 6 below contact section 7, and rises through section 7 countercurrent to substantially anhydrous liquid ammonia stream 8, which is admitted into unit 6 above section 7 and flows downwards within unit 6. Section 7 consists of any suitable gas-liquid contact means, thus section 7 may consist of a packed section provided with spherical balls or Raschig or Pall ring packing, or section 7 may consist of a plurality of bubble cap trays or sieve trays. The gas-liquid contact in section 7 results in the vaporization of ammonia into the synthesis gas phase, with substantial saturation of the gas phase with ammonia vapor usually being attained. A concomitant significant gas cooling effect is attained due to the absorption of latent heat of vaporization by the vaporizing ammonia, since the scrubbing is essentially adiabatic. In addition, a major portion of the gas stream impurities including substantially all of the water vapor is absorbed into the liquid ammonia phase in section 7. The residual unvaporized liquid ammonia containing dissolved impurities is discharged from unit 6 via stream 9.

The resulting synthesis gas stream 10 discharged from unit 6 above section 7 is now at a temperature in the range of $-10°$ C. to $-50°$ C. and is substantially saturated with ammonia vapor and is free of water vapor. Stream 10 typically contains in the range of 3% to 10% ammonia vapor content by volume, most of which is subsequently removed after compression of stream 10 as anhydrous liquid ammonia containing residual dissolved impurities, in accordance with the present invention. Stream 10 is compressed to a more highly elevated pressure in compressor 11, which is a reciprocating or centrifugal unit of conventional design. The compression of stream 10 in unit 11 requires substantially less power than would be needed if stream 1 or stream 5 was passed directly to unit 11, because of the reduction of gas stream temperature and volume in unit 6. The resulting gas stream 12 discharged from unit 11 is at a higher pressure and temperature than stream 10, due to the compression in unit 11, and is now cooled to a temperature below 0° C. in order to reduce subsequent compression power requirement and also to condense ammonia vapor from the gas stream. Stream 12 is passed through coil 13 in heat exchanger 14, and thus passes in heat exchange with cold refrigerant admitted to unit 14 as stream 15 and discharged as stream 16. The resulting cold process stream 17 discharged from coil 13 consists of cold synthesis gas containing condensed anhydrous liquid ammonia, and is at a temperature below 0° C. and preferably in the range of $-5°$ C. to $-50°$ C. As discussed supra, the condensed anhydrous liquid ammonia in stream 17 contains dissolved impurity such as carbon dioxide derived from the gaseous phase, and thus the synthesis gas is further purified in coil 13. Stream 17 is passed to gas-liquid separator vessel 18, which is a conventional means for separation of entrained liquid from a gas stream, such as a baffle or cyclonic vessel. The separated liquid phase stream 19 discharged from unit 18 consists of anhydrous liquid ammonia containing dissolved impurity.

The further purified and compressed synthesis gas stream 20 discharged from unit 18 is now passed to compressor 21 and compressed to a more highly elevated pressure. Unit 21 will usually be similar to unit 11 described supra, and the resulting gas stream 22 discharged from unit 21 is at a higher pressure and temperature level than the inlet stream 20. Stream 22 is now cooled to a temperature below 0° C. and preferably in the range of $-5°$ C. to $-50°$ C., by passing through coil 23 in heat exchanger 24. The gas stream thus passes in heat exchange with cold refrigerant admitted to unit 24 as stream 25 and discharged as stream 26. The resulting cold process stream 27 discharged from coil 23 consists of cold synthesis gas which usually contains a minor proportion of condensed anhydrous liquid ammonia. The condensed anhydrous liquid ammonia in stream 27 may contain a very minor proportion of dissolved impurity derived from the gaseous phase, and thus the synthesis gas may be still further purified in coil 23. Stream 27 is passed to gas-liquid separator vessel 28, which is similar to unit 18 described supra. The separated liquid phase 29 discharged from unit 28 consists of anhydrous liquid ammonia containing dissolved impurity.

The highly purified synthesis gas stream 30 discharged from unit 28 is now passed to compressor 31 and compressed to ammonia synthesis pressure, typically in the range of 150 kg./sq. cm. to 450 kg./sq. cm. Unit 31 will usually be similar to unit 11 described supra, although for more highly elevated pressures unit 31 may consist of a reciprocating compressor. The resulting purified and fully compressed synthesis gas stream 32 discharged from unit 31 is now passed to catalytic ammonia synthesis, usually as make-up gas to a synthesis loop in which synthesis gas is recirculated between alternate stages of catalytic ammonia synthesis and refrigerated condensation of liquid product ammonia.

Stream 32 is combined with recirculating synthesis gas stream 33 in the synthesis loop, and the combined gas stream 34 is passed to catalytic ammonia synthesis which takes place in converter 35 provided with catalyst bed 36. The resulting converted gas stream 37 discharged from unit 35 and containing synthesized ammonia vapor is passed through gas-to-gas heat exchanger 38 for preliminary cooling by heat exchange with the cold recycle synthesis gas of depleted ammonia content. The resulting cooled gas stream 39 is now subjected to refrigerated cooling in coil 40 of heat exchanger 41, through which a suitable refrigerant is circulated via inlet stream 42 and outlet stream 43. Condensation of product liquid ammonia takes place in coil 40, and the resulting cold gas stream 44 containing condensed product liquid ammonia is passed to gas-liquid separator 45, which is a known type of separator and may be a unit similar in configuration to unit 18 described supra. Product liquid ammonia stream 46 is removed from unit 45 and passed to product utilization, such as in the manufacture of synthetic fertilizers. The residual synthesis gas stream 47 removed from unit 45 now contains only a minor residual proportion of ammonia vapor, and is recirculated to converter 35 for further ammonia synthesis. A bleed or purge stream 48 is usually separated from stream 47 and discharged to atmosphere, in order to keep the concentration of inerts such as argon and methane in the recirculating synthesis gas at a desired level. The remaining cold synthesis gas stream 49 is passed through recirculation compressor 50, discharged from unit 50 as stream 51, and passed through heat exchanger 38, in which the recirculating synthesis gas is warmed to form stream 33.

Numerous alternatives within the scope of the present invention will occur to those skilled in the art. Thus, in order to effectively attain the results of the present invention, the scrubbing of the synthesis gas with liquid ammonia in unit 6 will be carried out at a pressure in the range of 2 kg./sq. cm. to 100 kg./sq. cm., to produce stream 10 at a temperature in the range of −10° C. to −50° C., and stream 12 should be cooled to a temperature below 0° C. to form stream 17 and thereby condense a significant proportion of anhydrous liquid ammonia from the gas stream. However, other ranges of process variables such as temperature and pressure merely constitute preferred embodiments of the invention for optimum results, and the invention is also operable in practice outside of these other ranges of process variables.

In some instances, such as when the synthesis gas stream 1 is available at a relatively low temperature, the precooling in unit 2 may be omitted and stream 1 may be passed directly into unit 6. It will be apparent that when the synthesis gas is passed into unit 6 at a relatively higher temperature level, relatively more ammonia vapor will be evolved and the ammonia vapor content of stream 10 will be increased. The compression of stream 10 to form stream 32 will preferably take place in a plurality of stages, with interstage cooling of the gas stream to a temperature below 0° C. and separation of condensed anhydrous liquid ammonia containing dissolved impurities before each successive stage. However, in some instances, such as when ammonia synthesis is to be carried out at a relatively low pressure level, stream 20 or stream 22 may be directly passed to the ammonia synthesis loop as make-up synthesis gas and added to stream 33. In this case, units 24, 28 and 31 will be omitted, and when stream 20 is passed to ammonia synthesis, unit 21 will also be omitted. In most instances at least two stages of compression with interstage cooling as carried out in units 11, 14, 18 and 21 will be provided in practice, and in some instances more than three stages of compression with interstage cooling may be provided. Stream 32 may alternatively be passed to the synthesis loop by addition to the converted gas stream 37, however this alternative is relatively less desirable in practice, since in this case the vapor pressure of ammonia in stream 39 is reduced due to dilution with make-up synthesis gas, and a greater amount of refrigeration is required in unit 41 for cooling of the gas stream in order to condense an equivalent proportion of product liquid ammonia.

An example consisting of tests of the liquid ammonia scrubbing of the synthesis gas stream as carried out in unit 6 will now be described.

*Example*

Synthesis gas containing 75% hydrogen and 25% nitrogen by volume was scrubbed in a 15.2 cm. diameter column, which was provided with a bed of packing consisting of 1.6 cm. diameter steel Pall rings. Following are the test results obtained.

TABLE I

[Bed thickness 122 cm.]

| Run No. | 1 | 2 | 3 | 4 | 5 |
|---|---|---|---|---|---|
| Gas Temperature, ° C.: | | | | | |
| Inlet | 12 | 12 | 11 | 12 | 12 |
| Outlet | −29 | −31 | −31 | −30 | −33 |
| Liquid Temperature, ° C.: | | | | | |
| Inlet | −30 | −31 | −31 | −31 | −34 |
| Outlet | −30 | −30 | −31 | −31 | −34 |
| Gas Rate Flow, kg.-mols/hr. | 6.32 | 12.2 | 23.65 | 12.2 | 12.81 |
| Liquid Flow Rate, kg./hr. | 244.5 | 244.5 | 244.5 | 727 | 244.5 |
| Ammonia Vapor Content of Exit Gas, kg./kg. dry gas | 0.1118 | 0.1071 | 0.1034 | 0.1099 | 0.1248 |
| Column Pressure, kg./sq. cm. | 25.3 | 25.3 | 25.0 | 25.0 | 18.6 |

TABLE II

[Bed thickness 30.4 cm.]

| Run No. | 1 | 2 | 3 | 4 | 5 |
|---|---|---|---|---|---|
| Gas Temperature, ° C.: | | | | | |
| Inlet | 10 | 13 | 10 | 13 | 10 |
| Outlet | −29 | −31 | −30 | −31 | −34 |
| Liquid Temperature, ° C.: | | | | | |
| Inlet | −31 | −32 | −31 | −33 | −36 |
| Outlet | −31 | −31 | −31 | −33 | −36 |
| Gas Flow, kg.-mols/hr. | 6.1 | 12.2 | 24.25 | 12.21 | 12.29 |
| Liquid Flow Rate, kg./hr. | 244.5 | 244.5 | 244.5 | 712 | 244.5 |
| Ammonia Vapor Content of Exit Gas, kg./kg. dry gas | 0.1052 | 0.1127 | 0.1173 | 0.1211 | 0.1704 |
| Column Pressure, kg./sq. cm. | 25.0 | 25.0 | 25.0 | 25.0 | 17.9 |

Certain conclusions are evident from the test results of Tables I and II. With other variables constant, similar results with respect to gas outlet temperature and ammonia vapor content of exit gas are obtained in both Tables I and II and therefore it is evident that equilibrium is obtained between the gas and liquid phases within 30 cm. of bed thickness, and that the outlet gas is substantially saturated with ammonia vapor. In addition, equilibrium is obtained regardless of gas flow rate up to the maximum rate tested, as evidenced by gas outlet temperature and ammonia vapor content of the exit gas in Runs Nos. 1, 2 and 3 of both Tables I and II. The fact that liquid inlet and outlet temperatures are substantially identical for all runs, and that the gas outlet temperature is substantially lower than the gas inlet temperature for all runs, indicates that cooling of the gas stream takes place in the adiabatic system primarily by vaporization of liquid ammonia into the gas stream. Increase of the liquid flow rate with other variables constant, as carried out in Run No. 4 of both Tables I and II, does not substantially alter the test results with respect to gas outlet temperature and ammonia vapor content of the exit gas, and consequently this is a further indication that equilibrium is attained at lower liquid flow rates. Finally, the lower column pressure maintained in Run No. 5 of both Tables I and II resulted in a higher ammonia vapor content or concentration in the exit gas stream, which is as expected since the partial pressure of ammonia vapor over liquid ammonia at a particular temperature level is constant under gas-liquid equilibrium conditions, which appear to have been substantially attained in all of the test runs.

Following is data relative to the purification attained by application of the present invention.

TABLE III.—IMPURITY CONTENT
[Parts per million]

| Stream No. | 5 | 10 | 20 |
|---|---|---|---|
| Concentration of Impurity (p.p.m.): | | | |
| Carbon Dioxide | 10 | 2 | 0 |
| Water Vapor | 2,000 | 10 | 0 |

The saving in overall power requirement for compression of the synthesis gas was also established. Thus, using the data of Run No. 2 of Table II supra, the ammonia vapor content of the scrubbed gas at 25.0 kg./sq. cm. pressure was 0.1127 kg./kg. dry gas. Per 100 mols or 865 kg. of unscrubbed synthesis gas, the ammonia vapor content was 5.73 mols, thus providing a total of 105.73 mols of ammonia saturated gas per 100 mols unscrubbed gas. The temperature of the gas was reduced from 13° C. to −31° C. Hence the ratio of power requirement for compression was:

$$\frac{(273-31)}{273+13} \frac{(105.73)}{100} = 0.895$$

Thus, the power requirement for compression with ammonia scrubbing was 89.5% of the power requirement for compression of unscrubbed gas.

I claim:

1. A method for the purification and compression of ammonia synthesis gas which comprises scrubbing synthesis gas with substantially anhydrous liquid ammonia at a pressure in the range of 2 kg./sq. cm. to 100 kg./sq. cm., said synthesis gas initially consisting principally of a nitrogen-hydrogen mixture and containing minor residual amounts of impurities including carbon dioxide and water vapor, whereby said synthesis gas is cooled to a temperature in the range of −10° C. to −50° C. and substantially saturated with ammonia vapor, and a major portion of said impurities including substantially all of said water vapor is dissolved in said anhydrous liquid ammonia, compressing the cooled synthesis gas, cooling the resulting compressed synthesis gas to a temperature below 0° C., whereby a portion of said ammonia vapor is condensed to anhydrous liquid ammonia containing dissolved impurities derived from said synthesis gas, separating said condensed anhydrous liquid ammonia from the resulting substantially impurity-free synthesis gas, and passing said substantially impurity-free synthesis gas to ammonia synthesis.

2. The method of claim 1, in which said synthesis gas is compressed in a plurality of stages of partial compression to successively higher pressure levels, said synthesis gas is cooled to a temperature below 0° C. between successive stages of compression, whereby a portion of said ammonia vapor is condensed to anhydrous liquid ammonia containing dissolved impurities before each successive stage of compression, and condensed anhydrous liquid ammonia containing dissolved impurities is separated from the cooled synthesis gas before each successive stage of compression.

3. The method of claim 1, in which said compressed synthesis gas is cooled to a temperature in the range of −5° C. to −50° C. to condense said ammonia vapor portion.

4. The method of claim 1, in which said substantially impurity-free synthesis gas is passed to ammonia synthesis by adding said synthesis gas as make-up gas to a circulating synthesis gas stream being passed to catalytic ammonia synthesis, after said circulating synthesis gas stream is cooled to condense product liquid ammonia and said product liquid ammonia is separated from said circulating synthesis gas stream.

5. The method of claim 1, in which said synthesis gas, which initially principally consists of a nitrogen-hydrogen mixture and contains minor residual amounts of impurities including carbon dioxide and water vapor, is cooled to a temperature in the range of 5° C. to 30° C. in a pre-cooling stage, prior to said scrubbing of said synthesis gas with substantially anhydrous liquid ammonia.

6. The method of claim 1, in which the ammonia vapor content of said synthesis gas after scrubbing with substantially anhydrous liquid ammonia and prior to compression is in the range of 3% to 10% by volume.

7. A method for the purification and compression of ammonia synthesis gas initially at a pressure in the range of 2 kg./sq. cm. to 100 kg./sq. cm. and consisting principally of a nitrogen-hydrogen mixture and containing minor residual amounts of impurities including carbon dioxide and water vapor which comprises cooling said ammonia synthesis gas to a temperature in the range of 5° C. to 30° C., scrubbing the cooled synthesis gas with substantially anhydrous liquid ammonia, whereby said synthesis gas is cooled to a temperature in the range of −10° C. to −50° C., and substantially saturated with ammonia vapor, and a major portion of said impurities including substantially all of said water vapor is dissolved in said anhydrous liquid ammonia, compressing the cooled synthesis gas, cooling the resulting compressed synthesis gas to a temperature in the range of −5° C. to −50° C., whereby a portion of said ammonia vapor is condensed to anhydrous liquid ammonia containing dissolved impurities derived from said synthesis gas, separating said condensed anhydrous liquid ammonia from the resulting substantially impurity-free synthesis gas, and passing said substantially impurity-free synthesis gas to ammonia synthesis.

8. The method of claim 7, in which said synthesis gas is compressed in a plurality of stages of partial compression to successively higher pressure levels, said synthesis gas is cooled to a temperature below 0° C. between successive stages of compression, whereby a portion of said ammonia vapor is condensed to anhydrous liquid ammonia containing dissolved impurities before each successive stage of compression, and condensed anhydrous liquid ammonia containing dissolved impurities is separated from the cooled synthesis gas before each successive stage of compression.

9. The method of claim 7, in which said substantially impurity-free synthesis gas is passed to ammonia synthesis by adding said synthesis gas as make-up gas to a circulating synthesis gas stream being passed to catalytic ammonia synthesis, after said circulating synthesis gas stream is cooled to condense product liquid ammonia and said product liquid ammonia is separated from said circulating synthesis gas stream.

10. The method of claim 7, in which the ammonia vapor content of said synthesis gas after scrubbing with substantially anhydrous liquid ammonia and prior to compression is in the range of 3% to 10% by volume.

References Cited

UNITED STATES PATENTS

| | | | |
|---|---|---|---|
| 1,679,792 | 8/1928 | Slade et al. | 23—199 |
| 1,830,167 | 11/1931 | Jones | 23—199 X |

OTHER REFERENCES

The Canadian Patent Office Record, pp. 50, Jan. 5, 1926, Abstract Ser. No. 257,043.

NORMAN YUDKOFF, *Primary Examiner.*

W. PRETKA, *Assistant Examiner.*